United States Patent [19]
Snyder et al.

[11] Patent Number: 6,089,598
[45] Date of Patent: Jul. 18, 2000

[54] PYROTECHNIC INFLATOR WITH REDUCED EXTENT FILTER AND CARTRIDGE CHARGES

[75] Inventors: Brian T. Snyder, Hooper; Brent K. Olson, Clearfield; Donald J. Cunningham, North Ogden; J. Kirk Storey, Farmington; Scott A. Jackson, Centerville; James D. Erickson, Ogden, all of Utah

[73] Assignee: Autoliv ASP, Inc., Ogden, Utah

[21] Appl. No.: 08/753,309

[22] Filed: Nov. 22, 1996

[51] Int. Cl.[7] .................................................. B60R 21/28
[52] U.S. Cl. ........................ 280/740; 280/742; 280/743.1
[58] Field of Search .................................. 280/740, 742, 280/743.1

[56] References Cited

U.S. PATENT DOCUMENTS

| | | | |
|---|---|---|---|
| 3,880,447 | 4/1975 | Thorn et al. | 280/740 |
| 4,005,876 | 2/1977 | Jorgensen et al. | 280/741 |
| 5,149,129 | 9/1992 | Unterforsthuber et al. | 280/741 X |
| 5,318,323 | 6/1994 | Pietz | 280/741 X |
| 5,374,407 | 12/1994 | Decker et al. | 280/741 X |
| 5,433,475 | 7/1995 | Kokeguchi | 280/740 X |
| 5,478,112 | 12/1995 | Knobloch | 280/741 |
| 5,505,488 | 4/1996 | Allard | 280/741 X |
| 5,671,946 | 9/1997 | Whalen et al. | 280/741 |
| 5,833,264 | 11/1998 | Honda et al. | 280/740 X |

FOREIGN PATENT DOCUMENTS

| | | |
|---|---|---|
| 19543795 | 5/1997 | Germany . |

*Primary Examiner*—Peter A. Nelson
*Attorney, Agent, or Firm*—Sally J. Brown

[57] ABSTRACT

An airbag inflator having a reduced area filter and cartridge-loaded generant. The inflator has a tubular housing with a plurality of exit ports in a limited angular extent. A filter having the general shape of a section of a tube is received within the housing within the extent of the exit ports. The filter has lateral edges which are compressed to reduce the thickness of the filter along these edges, increasing the inner diameter of the filter. A hollow cylindrical cartridge may be provided to house a quantity of pyrotechnic gas generant. The cylindrical cartridge is received within the housing, with the filter interposed between the cartridge and the exit ports. The increased inner diameter of the filter permits the use of a larger diameter cartridge compared to a filter which has not had its lateral edges compressed, which in turn permits a shorter inflator to hold the same volume of generant. The housing may be formed by double impact extrusion to have two separate interiors, each having a generant cartridge. This will permit the cartridges to be fired separately, providing adaptive performance for the inflator.

41 Claims, 3 Drawing Sheets

PYROTECHNIC INFLATOR WITH REDUCED EXTENT FILTER AND CARTRIDGE CHARGES

BACKGROUND OF THE INVENTION

1. Field of the Invention

The present invention relates in general to inflators for airbag supplemental restraint systems. In particular, the present invention relates to an improved inflator having a filter of reduced size, simplified gas generant loading through the use of cartridges, and adaptive capability.

2. Description of the Related Art

Airbag supplemental restraint systems are increasingly common in contemporary vehicles. Such systems typically include a collision sensor to detect an impact, an inflator which produces a quantity of gas very rapidly upon receipt of a signal from the sensor, and a flexible cushion which is inflated by this gas. The occupant of the vehicle is restrained by this cushion, which deflates to lessen the forces upon the occupant, thus reducing or eliminating injury.

Various types of inflators are known, which operate upon various principles. Many inflator types include a quantity of pyrotechnic gas generant. This generant is in a solid form, typically pellets, granules, etc., until it reaches a high temperature, at which point the generant converts to a gas in an energetic reaction. While the great majority of the generant converts to a high temperature gas, some particulate matter, often referred to a slag, is produced. This slag is also quite hot, and is often entrained in the gas flow from the inflator. If a sufficiently large quantity of this very hot slag entered the cushion, it might impact against a portion of the cushion contacting the occupant, causing burns to the occupant. Similarly, if the gas inflating the cushion were too hot, the heated cushion would burn the occupant. To avoid this, inflators containing pyrotechnic generant have typically included filters to treat the gas. These filters serve the dual purposes of removing slag and cooling the gas.

For passenger side airbags, these inflators have commonly been formed by a tubular metal housing having exit ports extending therethrough, a tubular filter within this housing, and a quantity of gas generant within the tubular filter. In operation the generated gas would of course pass through the filter to reach the exit ports, since the filter is interposed between the generant and the ports. However, this gas flow is not uniform, but is mainly in the areas of the filter opposed to the exit ports. It is in these areas that the majority of slag filtering occurs, although heat transfer, and thus cooling of the gas, occurs about the entire periphery. While this arrangement is serviceable, there is a constant desire to reduce the size, weight and cost of inflators.

One arrangement directed toward these goals is shown in U.S. Pat. No. 5,478,112 to Knobloch. Knobloch shows that the housing may be formed with two longitudinal ribs along the interior, with the exit ports between the ribs. The filter, in the form of resilient mesh layers, may then be formed not as a tube, but as a section of a tube having a limited angular extent. This limited angular extent, or width, is slightly greater than the distance between the ribs, such that the filter may be forced between the ribs. The elastic nature of the metal mesh then secures the filter in place, and reduces the possibility of gas flow around the edges of the filter (i.e., between the filter and the ribs), referred to as flow-by.

This arrangement reduces that amount of filter material required, and thus can reduce the weight of the inflator. Further, and as described more fully below, the area in the housing which was formerly occupied by the removed portion of the filter may instead be filled with the gas generant. As such, the same volume of generant may fit in a shorter length of housing, serving to reduce the size of the inflator.

While this arrangement provides advantages over the prior art, difficulties remain. For example, the filter must have a very tight fit against the ribs to ensure there is no flow-by. This tight fit causes difficulty in assembly, since care must be taken to insert the metal mesh filter in a manner to maintain its resilience, without bending or plastic deformation. The required fit is also problematic over the life of the inflator. While the fit may be initially tight, the tendency of metals to creep may result in a relaxation of the fit in the years the inflator may wait before activation.

Further, the generant of Knobloch is loose within the housing. It is this loose packing which permits the generant to occupy the area of the removed filter portion and realize the reduction in length. The present inventors have found it desirable, however, to pack the generant into cylindrical cartridges, and to then mount these cartridges within the housing. These cartridges of course do not permit flow of the generant about the filter, and as such, less of a length reduction is realized, as is described more fully below. Further, portions of the interior of the housing will be void, without any filter or generant. It is known in the art that such void areas reduce the performance of the inflator, often resulting in the need for more generant or initiating material. This larger volume of generant increases the length of the inflator, so that little or no length reduction would be achieved when using generant cartridges or solid generant blocks.

Another remaining problem is treatment of the gas. The reduced amount of the filter will of course be formed with a sufficient thickness to adequately remove the slag from the gas. However, even such a "thick" filter will have a volume less than that of the original tubular filter. This reduced volume of the filter also results in reduced amounts of cooling capacity. As such, the gas will likely have a higher, and possibly dangerous, temperature.

The present invention avoids these difficulties. The problem of flow-by is eliminated by formation of reduced porosity sections on the edges of the filter, such that the gas will flow through the central portion of the filter. These reduced porosity sections are preferably formed by compressing the edges of the filter to reduce its thickness. This advantageously permits the introduction of a larger generant cartridge, greatly reducing the problem of free, void volume in the inflator. This also greatly reduces the necessary length of the inflator. Finally, the problem of gas treatment is solved by providing the cartridge with a separate pre-cooling screen which acts as a heat sink to reduce gas temperature before it reaches the filter proper. With these features, an inflator may be provided which is smaller and approximately 20% lighter than a prior art inflator with equivalent performance.

SUMMARY OF THE INVENTION

An object of the present invention is to provide an inflator which provides a quantity of inflation gas safely and reliably.

Another object of the present invention is to provide such an inflator having reduced size and weight.

Yet another object of the present invention is to provide such an inflator having a filter of reduced extent.

A further object of the present invention is to provide an inflator with such a filter which reduces the possibility of gas flow-by.

Another object of the present invention is to provide an inflator having such a filter which increases the amount of generant while reducing free volume.

A further object of the present invention is to provide an inflator having such a filter which is securely retained in the proper position.

Another object of the present invention is to provide such an inflator which houses the gas generant in a cartridge.

Yet another object of the present invention is to provide such an inflator which is adaptive in the amount of gas produced.

These and other objects are achieved by an airbag inflator having a reduced area filter and cartridge-loaded generant. The inflator has a tubular housing with a plurality of exit ports in a limited angular extent. A filter having the general shape of a section of a tube is received within the housing within the extent of the exit ports. The filter has lateral edges which are compressed to reduce the thickness of the filter along these edges, increasing the inner diameter of the filter. A hollow cylindrical cartridge may be provided to house a quantity of pyrotechnic gas generant. The cylindrical cartridge is received within the housing, with the filter interposed between the cartridge and the exit ports. The increased inner diameter of the filter permits the use of a larger diameter cartridge compared to a filter which has not had its lateral edges compressed, which in turn permits a shorter inflator to hold the same volume of generant. The housing may be formed by double impact extrusion to have two separate interiors, each having a generant cartridge. This will permit the cartridges to be fired separately, providing adaptive performance for the inflator.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
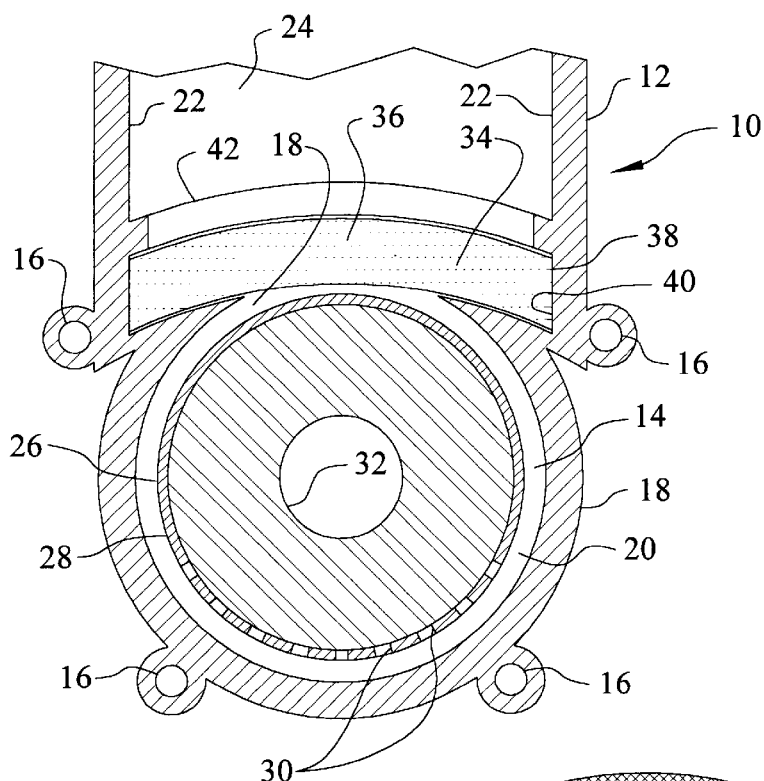
FIG. 1 is a cross-sectional end view of a module according to a first embodiment of the present invention.

With reference to FIG. 1, an airbag inflation device, specifically an airbag module, according to a first embodiment of the present invention is generally designated by reference numeral 10. The module 10 is of the type commonly used for placement on a passenger side of a vehicle, and as such is generally elongated in a direction into the page. The module 10 includes a rigid housing 12, preferably formed by aluminum extrusion. The housing 12 will have a generally U-shaped cross-section, as shown. Although not shown, the housing will include substantially planar longitudinal ends, upon which are mounted end plates 14 (only one shown). The end plates 14 assist in completing the enclosure of the housing, as is known in the art. The end plates 14 may be secured to the housing 12 by fasteners (not shown) extending through holes (not shown) in the end plates 14 and secured to associated mounting holes 16 in the housing 12. The mounting holes 16 may be extruded with the housing, as shown. Other mounting arrangements for the end plates 14 may of course be used.

The housing 12 includes a main wall 18 in an area corresponding to the crossbar section of the U-shaped housing. The main wall 18 and end plates 14 define an inflator chamber 20. Extending from the main wall 18 are a pair of side walls 22, which correspond to the uprights or legs of the U-shaped housing. The side walls 22 and end plates 14 define a cushion housing section 24. A mouth of an airbag cushion (not shown) would be secured within this housing section, with the folded body of the cushion normally stored therein also.

The inflator chamber 20 serves to house an inflator cartridge 26. The inflator cartridge 26 includes a tubular diffuser wall 28 having a plurality of diffuser ports 30 extending therethrough. The diffuser wall 28 will be secured within the housing by clamping between the end plates 14. Mounted within the diffuser wall is a quantity of gas generant 32. The generant may take various formulations, and may be provided in various forms, such as granules, pellets, etc. In the embodiment shown, the generant 32 is in the form of annular wafers, as is known in the art. Also as is known, there may be provided a quantity of ignition material (not shown) in the central aperture of the wafers, and the wafers may be protected from moisture by a surrounding layer of foil, plastic, or other laminate (not shown). In a manner known in the art, an initiator (not shown) will extend through one of the end plates 14 into communication with the ignition material and wafers. The initiator is in turn electrically connected to a collision sensor (not shown).

Upon receipt of a signal from the collision sensor the initiator releases a quantity of heat, starting a reaction in the ignition material, which in turn starts a reaction in the gas generant 32. This reaction is very energetic, and releases a quantity of gas very quickly, and at a high temperature. While the vast majority of the gas generant 32 will convert directly into the gas, a small quantity will remain in solid, particulate form, and is commonly referred to as slag.

As may be envisioned, the gas from this reaction will flow from the diffuser via the diffuser ports 30. In this regard it may be desirable if the diffuser ports are limited to an angular extent less than approximately 340°, and with the diffuser angularly oriented (i.e., clocked) such that the ports 30 face toward the main wall 18, and not directly toward the cushion housing section 24. Such an arrangement would cause the gas to flow against the interior of the main wall 18 and change direction to flow toward the cushion housing section 24. Such impingement of the gas against the housing surfaces, and such changes in flow direction, assist in removing the slag from the entraining gas flow. Even with such measures, however, it will be necessary to treat the gas to remove more of the slag, and to reduce the temperature of the gas.

To this end there is provided a filter 34, generally interposed between the inflator cartridge 26 and the cushion housing section 24. More particularly, the filter 34 is interposed between the inflator chamber 20 and the cushion housing section 24. This distinction will be made more clear below. The filter 34 is formed by a mass of material providing filtration and cooling for the high pressure and velocity gas, and may be formed as a monolithic or unitary filter, such as from foamed carbon or ceramic, or aggregated ceramic particles, such as shown in U.S. Pat. No. 5,547,638 to Rink et al. Alternatively, the filter 34 may be formed from a various layers of metal meshes, ceramic papers, fibrous and/or non-woven metal mat, etc. stacked together.

As described above, the filter in typical prior art inflators would be in the form of a tube extending completely around the periphery of the inflator cartridge 26. In this invention, however, the filter 34 has a reduced area or extent, and extends over only a portion of the periphery of the cartridge 26. As such, the filter has the form of a longitudinal section of a tube, and includes a main body 36 bounded by longitudinal ends (not shown) and lateral edges 38. While this is the general form, the angular extent (i.e., lateral width) of the filter may vary depending upon the particular application. So too, may the radius of the cylindrical section vary. Specifically, the radius may be formed as infinite, such that the filter is flat, rather than curved as shown.

As may be envisioned, the filter must be held in position within the housing 12, both before and during activation of the module. To accomplish this, the housing 12 includes a pair of filter grooves 40 extending in the longitudinal direction, and located intermediate the inflator chamber 20 and cushion housing section 24. The filter grooves 40 are sized to receive the lateral edges 38 of the filter to support the same in the housing. The filter grooves 40 can thus maintain the filter 34 between the inflator chamber 20 and cushion housing section 24 at least during storage.

As may be envisioned, the gas from the inflator cartridge 26 will create a large pressure surge within the inflator chamber 20. This will cause a force on the filter 34, pushing the filter away from the inflator chamber 20. For those filters which are sufficiently strong (typically those formed as a monolithic unit), the filter grooves 40 may be all that is required to maintain the filter in place during flow of the gas. However, for less rigid filters, support may be required. For this, a diffuser 42 may extend between the side walls 22 just above (i.e., downstream with respect to the flow of gas) the filter 34. The diffuser may take any shape known in the art, and typically will consist of a metal barrier extending between the walls 22 and having numerous apertures through which the gas may flow. The placement and shape of the apertures affects the flow of gas through the diffuser, as is known in the art.

The diffuser thus can prevent the filter 34 from being blown from its mounting in the filter grooves 40 by the force of the gas. There may still be a problem, however, of the gas seeking to flow around the filter. Specifically, the gas will tend to take the path of least resistance. Since the filter blocks flow to a certain extent, the gas may have a tendency to flow around the lateral edges 38 and longitudinal ends of the filter. This is typically referred to a "flow-by". To prevent this, a gasket or seal of an elastomeric material (not shown) may be placed between the longitudinal ends of the filter and the end plates 14, and between the lateral edges 38 and the filter grooves 40.

The presence of such a seal at the lateral edges, however, may impede sliding of the filter into position. The seal itself could also be damaged or compromised by attempts to slide the filter into its assembled position. As such, it may be preferred to eliminate the use of the seal (at least at the lateral edges 38) and employ a different arrangement.

For example, the depth of the filter grooves 40 at the upstream side (with respect to the flow of the gas) may be increased to the point to eliminate flow-by, as shown in FIG. 1. Specifically, if the groove is sufficiently deep, the gas will travel laterally inward to reach the filter. The gas will not flow along the very sharp change in direction required to flow outward and between the lateral edge 38 and the filter groove 40. The need for a separate seal may thus be eliminated. As shown in FIG. 1, the increased depth filter grooves 40 may advantageously be provided by forming the main wall 18 as a section of a tube.

With this arrangement using the reduced area filter, the size of the module may be reduced. In particular, the size of the inflator chamber 20 is reduced, since the filter does not extend completely around the inflator cartridge 26. Since the inflator chamber 20 has a reduced diameter, the distance between the side walls 22 is similarly reduced. In this manner the inflator 10 provides adequate treatment of the gas produced, but also has a smaller size, lighter weight, and reduced material costs.

Figures 2, 3:
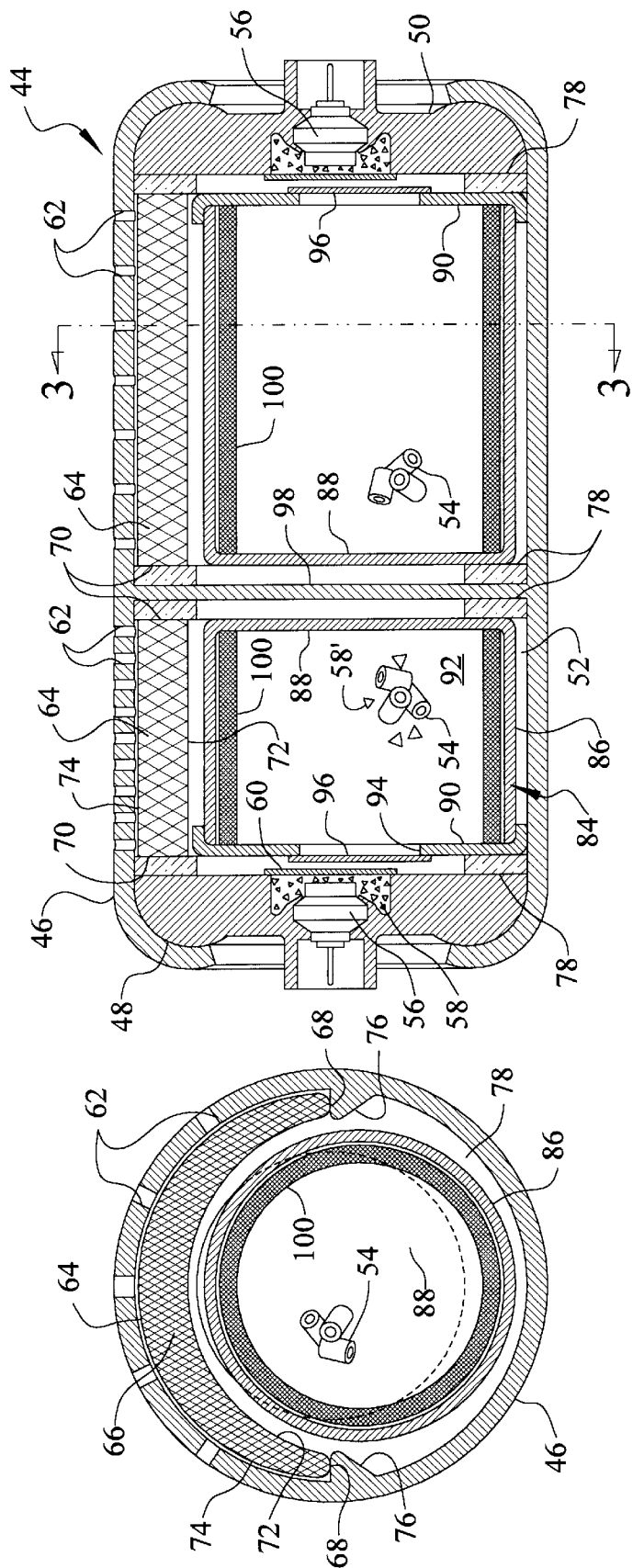
FIG. 2 is a cross-sectional side view of an inflator according to a second embodiment of the present invention.
FIG. 3 is a cross-sectional view along line 3—3 of FIG. 2.

With reference to FIGS. 2 and 3, a second embodiment of an airbag inflation device, specifically an inflator, according to the present invention is generally designated by reference numeral 44. As shown, the inflator is generally elongated, and is of the type typically employed for passenger side airbags. Reductions in scale may make this inflator suitable for side-impact airbags, and reducing the elongation may make the inflator suitable for use in a driver side airbag. At least for passenger side use, the inflator will typically be mounted within a housing which secures the cushion (not shown) and a decorative cover (not shown).

The inflator 10 includes an outer wall 46 formed of metal or other rugged material. In the embodiment shown, the outer wall has the general form of a tube with a circular cross-section. At a first end of the outer wall there is mounted a first end cap 48, and at the opposite, second, end of the outer wall there is a second end cap 50. As shown, the end caps may have rounded annular outer faces, and the longitudinal ends of the outer wall 46 may be swaged over the end caps to secure the same. The end caps could be attached in other ways, such as integrally forming the cap with the outer wall, welding, etc. The outer wall 46 and end caps 48 and 50 together define an interior chamber 52.

Within the interior chamber 52 there is provided a quantity of gas generant material (hereafter referred to as generant) 54. The generant is a material which, upon reaching an elevated ignition temperature, will rapidly combust to form a gas, such as nitrogen. Various formulations of generant are known in the art, and the generant may be in various forms, such as powder, tablets, wafers, etc. In the embodiment shown, the generant is in the form of short tubular pellets.

To permit the generant 54 to reach the necessary elevated temperature, the first end cap 48 mounts an ignitor or squib 56. As is known in the art, upon receipt of an electrical signal from a collision sensor (not shown), the squib will produce a brief flash of heat. This alone may be sufficient to begin the combustion of the generant 54. However, it may be necessary or desirable to provide a quantity of initiator material 58. This initiator material will combust upon activation of the squib 56, producing additional heat to aid in beginning combustion of the generant 54. The initiator material 58 may be advantageously located in a depression in the interior face of the first end cap 48, surrounding the squib 56. To maintain the initiator material 58 in place, a foil (or other thin film) cover 60 may be secured over the depression, as shown. The cover is consumed upon activation of the squib 56.

As noted, the squib 56 and initiator material 58, if used, will provide the heat necessary to begin combustion of the generant 54. Also as noted, the generant will produce a quantity of inflation gas upon combustion. To permit this gas to exit the inflator 10 and thus fill the cushion (not shown), the outer wall 46 of the inflator is provided with a plurality of gas exit ports 62. A thin foil (not shown) may be secured on the interior face of the outer wall 46 to cover the gas exit ports 62, and thus prevent moisture from entering the inflator. As best shown in FIG. 3, the ports 62 do not extend about the entire periphery of the inflator, but only within an area of limited angular extent. The reasons for this will be apparent from the discussion below.

As in the previous embodiment, the generated gas must be treated to remove particulates and to reduce its temperature. As such, a filter 64 is provided between the generant 54 and the exit ports 62. In the prior art, the filter was typically a tube extending about the entire interior chamber 52, between the generant 54 and the outer wall 46. In the present invention, however, the filter has a reduced area or extent, similar to the first embodiment. Specifically, the filter extends about only a portion of the periphery, as best illustrated in FIG. 3. In this embodiment the filter extends about approximately 180°, or half of the periphery. The particular extent of the filter may of course vary depending upon the particular application.

The filter 64 is again a mass of material providing filtration and cooling for the high pressure and velocity gas, and again may be formed as a unitary element as described above, or as a stack of meshes, papers, fibrous and/or non-woven metal mat, etc. In either case the filter will include a main body 66 bounded by lateral edges 68 (FIG. 3) and longitudinal ends 70. The filter will also define an entrance face 72 and an exit face 74, with reference to the direction of flow of the gas through the filter. The main body will of course provide sufficient filtering and cooling for the particular application.

Since the gas exit ports 62 and filter 64 do not extend about the entire periphery of the inflator, it is necessary to ensure that the filter 64 is aligned with (i.e., covers) the gas exit ports 62. To ensure the proper positioning (or clocking) of the filter, the interior face of the outer wall 46 may include a pair of support ledges 76 (FIG. 3) extending inward a sufficient distance to abut against the lateral edges 68 of the filter 64 and hold the filter in position. In this regard it is preferred that the support ledges 76 be positioned to provide a sufficiently tight fit for the filter that the filter will not move about to cause noise, and will provide proper gas flow (as described below), yet is easy to assemble. One advantageous arrangement is to form the filter and place the ledges to have an angular extent other than 180°, such that the filter must be placed in the proper orientation, or the filter will not rest upon the ledges. This ensures proper assembly of the inflator.

As shown, the support ledges 76 are a monolithic extension of the outer wall 46, formed during extrusion or impact extrusion of the outer wall 46, and thus may extend the length of the outer wall 46. If the outer wall 46 is to be swaged over end caps as shown, it may be necessary to cut away a portion of the support ledges 76 at the longitudinal ends which are to be swaged. Alternatively, the support ledges 76 may be separate elements secured in position on the outer wall 46 as by welding.

As with the first embodiment, the problem of flow-by of the gas is a concern. With regard to the longitudinal ends 70 of the filter, the inflator 44 may be provided with an end seal 78 at each of the longitudinal ends 70. Each end seal 78 is formed of an elastomeric material which will withstand the temperature in the inflator during activation, such as high temperature rubber. The end seals are preferably formed as rings. The outer diameter of the end seal 78 will be equal to, or slightly greater than, the diameter of the exit face 74, and the seal will have a radial thickness equal to, or slightly greater than, the largest radial thickness of the filter 64. By providing the end seals as rings, the squib 56 may access the generant 54 without having the seal blocking the flow of heat, as best illustrated in FIG. 2. While not shown, it may be necessary to form notches in the outer diameter of the seals to accommodate the support ledges 76.

Flow-by of the gas is also a concern along the lateral edges 68. Forming the support ledges 76 such that they extend outward a sufficient distance so as to create a tortuous path for the gas, similar to the first embodiment, and as shown in FIG. 2, may cause a reduction in flow-by around the lateral edges 68. Formation of a tight fit between the lateral edges 68 of the filter and the support ledges 76 is believed to be of greater effect in preventing the flow-by. However, in the preferred arrangement, the flow-by is believed to be prevented to the greatest extent by forming the filter itself with variations in permeability.

Specifically, the permeability of the filter is reduced adjacent the lateral edges 68, such that it is more difficult for the gas to flow through the edge portions of the filter, and easier for the gas to flow through the central region of the filter. Since the gas will attempt to take the path of least resistance, the gas will preferentially flow toward the central region of the filter 64, and will resist flow-by around the lateral edges 68. This effect is sufficient such that the extent of the support ledges 76 may be decreased to the point required simply to support the filter, with no concern for forming a tortuous path. The amount of variation in permeability required will of course vary with the various pressures and gas quantities used for different applications. However, as a general rule the central third of the filter may be formed with the usual desired permeability, and the permeability may increase laterally outward to a point where the lateral edges 68 are essentially impermeable.

Figure 4:
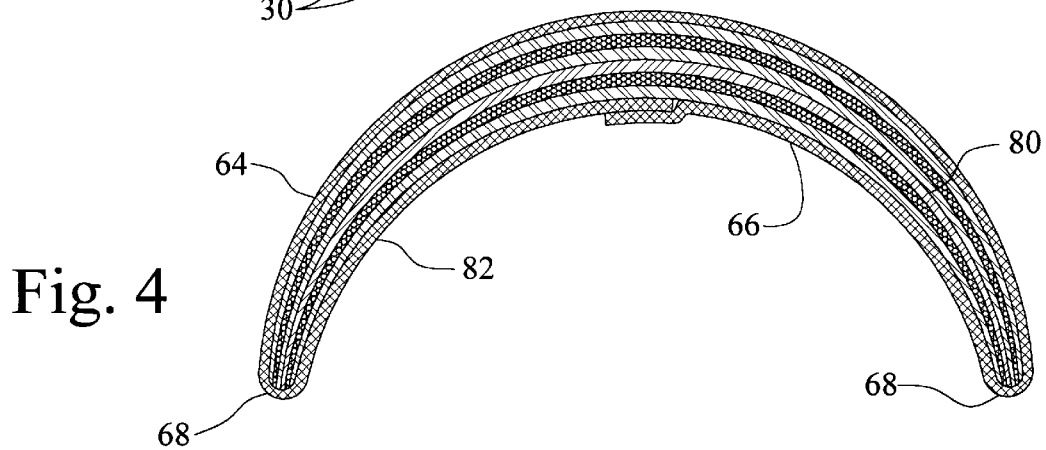
FIG. 4 is a detail cross-sectional view of the filter of FIG. 3.

This variation in permeability may be achieved in various ways, depending upon the material used to form the filter. For monolithic foamed filters and monolithic aggregate filters, the pore size may be decreased at the edges to increase the permeability. For filters formed as stacks of meshes, papers, fibrous and/or non-woven metal mat, etc., the edges may be compressed. This is illustrated in FIG. 4, where the filter 64 may be seen to be formed of numerous internal layers 80. As noted, these internal layers 80 may be metal meshes, ceramic papers, fibrous and/or non-woven metal mat, etc. Surrounding the internal layers 80 is an outer mesh covering 82. The edges of the outer mesh covering 82 do not correspond to the lateral edges 68. Rather, the outer mesh covering 82 is bent over each of the lateral edges 68, and the edges of the outer mesh covering 82 overlap, preferably at a central location. The edges of the outer mesh covering 82 are then secured together, such as by welding. The portions of the filter 64 adjacent each of the lateral edges 68 are then compressed, such as by clamping, to plastically deform the outer mesh covering 82 (and any deformable ones of the internal layers 80) into a compressed state. This compression decreases the permeability adjacent the lateral edges 68.

It may be seen, therefore, that one important aspect of the present invention is the provision of a filter having a reduced extent, and reduced permeability adjacent the lateral edges.

This arrangement reduces the amount of material required for the filter, reduces the weight of the inflator, and still eliminates the problem of flow-by.

Figure 5:
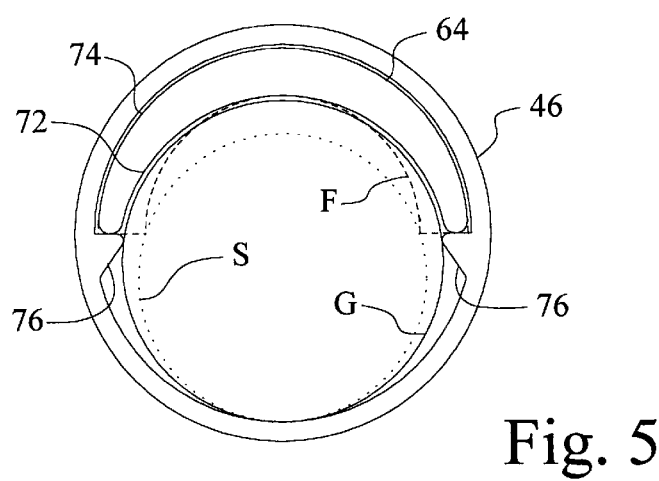
FIG. 5 is an illustration comparing filter shapes in a cross-section view similar to FIG. 3.

The example shown in FIG. 4 using the compressed edges has a further advantage relating solely to its geometry or shape. Specifically, another important aspect of the resent invention is the use of non-concentric diameters for the entrance face 72 and exit face 74 of the filter. In particular, the center point for the entrance face diameter is offset from the center point of the exit face diameter, in a direction from the exit face toward the entrance face. In the preferred form the entrance face 72 has a diameter which is smaller than the diameter of the exit face 74, as best illustrated in FIGS. 3–5. A similar effect can be achieved using other ratios of diameters, including equal diameters. As may be seen, this causes a tapering reduction in thickness of the filter toward the lateral edges 68, which is the desired geometric arrangement or shape. This arrangement is not limited to the compressed mesh filters shown, but is equally applicable to monolithic filters described above. The advantage of this offset in diameters is to permit an increased amount of generant (and a corresponding reduction in wasted free volume) to be used when the generant is a solid wafer, or is held in a capsule as described more fully below.

This increase in generant volume is illustrated in FIG. 5. Here, the outer wall 46 and filter 64 are shown as solid lines, as is a circle G representing the outer surface of a cylindrical generant form. Such a cylindrical generant form may be a stack of generant wafers, a solid mass of generant extruded with a cylindrical shape, or a capsule constraining a quantity of loose generant (such as pellets or powder) into a cylindrical shape. As preferred, the entrance face 72 and exit face 74 of the filter have offset center points to provide the tapering toward the lateral edges 68. This permits the circle G to have a diameter approximately equal to that of the entrance face 72. In contrast, dashed lined F represents the entrance face of a filter having a constant thickness. The largest cylindrical object which may be placed within the filter F is represented by dotted line S. As may be seen, the diameter of circle S is much smaller than that of circle G. As such, with the offset center points, a larger diameter, and thus a larger volume, of generant may be used. Conversely, the amount of free space within the inflator is greatly reduced with the use of the offset diameter filter 64. A reduction in this free space typically reduces the amount of heat necessary from the squib and/or initiating material. With these advantages, an inflator may be provided which is smaller and approximately 20% lighter than a prior art inflator with equivalent performance.

As discussed above, these advantages are realized when the generant is constrained to a cylindrical generant form. This is the case with a stack of generant wafers, or with a cylindrical mass of generant, formed for example by extrusion. This is also the case in another aspect of the invention, when the generant is contained within a capsule.

A first embodiment of a capsule is best shown in FIG. 2, and is generally designated by reference numeral 84. The capsule is a hollow cylinder having a tubular side wall 86 having longitudinal ends, an end wall 88 secured to a first of these ends, and a flow cap 90 secured to a second of the longitudinal ends. The side wall 86, end wall 88 and flow cap 90 together define a capsule interior 92 in which the generant 54 is contained. In this first embodiment, the side wall 86 and end wall 88 are formed as a single unit or cup, preferably of drawn aluminum although other materials may be used. Similarly, the flow cap 90 may be formed of a sheet of material, such as aluminum, with its edges crimped over the end of the side wall 86. It is noted that the thickness of these elements is exaggerated for clarity in the figures, and in their preferred form (i.e., drawn aluminum) they will each have a thickness of approximately 0.01–0.015 cm (0.004–0.006 inches). As such, in reality the capsule 84 would take up more space within the interior chamber 52 than is shown here.

The capsule 84 with the generant 54 contained therein provides a discrete self-contained unit which may be loaded or placed into the interior chamber 52 of the inflator. This is preferable to the use of loose generant pallets or powder, which is difficult to maintain in place during mounting of the first end cap 48 and second end cap 50. The use of the capsule 84 also provides advantages over the use of generant wafers. While the wafers are much easier than powder or pellets to hold in position during assembly of the end caps, they require the use of a rod of initiator material to extend through their inner diameter to achieve proper combustion. With the use of the capsule 84, a quantity of initiator material 58' (having the same, or a different, formulation to that of material 58) may be mixed in among the generant 54, eliminating the need for forming and assembling the rod of initiator material.

In practice, the gas created by the generant 54 within the capsule 84 must of course escape the capsule to leave the inflator. In this embodiment the capsule 84 will be mainly consumed during combustion of the generant 54, with any particulate residue being captured by the filter 64. Further, the heat from the squib 56 must be able to contact the generant 54 within the capsule 84 to begin combustion of the generant 54.

To this end, the capsule 84 is placed within the interior chamber 52 such that the flow cap 90 is opposed to the squib 56. Additionally, the flow cap will be formed to allow the heat from the squib 56 to breach the flow cap 90. In the present embodiment, the thin aluminum may be too rugged to permit this (depending upon the output of the squib 56). To facilitate the desired breach, the flow cap 90 is preferably formed with an access port 94 extending therethrough. To ensure that the generant 54 does not fall through this access port 94, a rupture sheet 96 formed of foil or plastic film is secured over the access port 94, such as by adhesives or other bonding techniques. This rupture sheet 96 is sufficiently fragile to rupture upon activation of the squib 56, and permit the heat from the squib 56 to enter the capsule interior 92 to begin combustion of the generant 54.

As may be seen, the use of the capsule 84 eases assembly compared to loose generant pellets or powder, simplifies construction compared to a wafer stack and initiator rod assembly, and permits an advantageous packing of the generant with little wasted volume. When used with the reduced extent filter of the present invention, the combination provides a very advantageous reduction in inflator size and weight.

The assembly of this inflator is relatively simple given the small number of parts. To begin, the first end cap 48 may be inserted into the outer wall 46 and at least temporarily secured in position. This may be by swaging of the end of the outer wall 46 over the first end cap 48. Thereafter, an end seal 78 is inserted through the remaining open end and abutted against the first end cap 48. The filter 64 is then slid into position, and the capsule 84 placed in the remainder of the interior chamber 52 (with the flow cap 90 opposed to the squib 56). Another end seal 78 is then inserted through the remaining open end to cover the exposed end of the filter 64. The second end cap 50 is then inserted into the interior chamber 52 to rest upon this end seal 78, and the remaining end of the outer wall 46 is swaged over the second end cap 50. During this process, the end seals 78 are pressed against the ends of the filter 64 to prevent flow-by. The end seals 78 also securely retain the capsule 84 in position, and also serve to absorb any tolerance build-up in the various component sizes.

While this arrangement is sufficient, various modifications may be made. For example, the inflator may easily be modified to an adaptive inflator. As is known in the art, an adaptive inflator varies its performance in response to the particular circumstances of a collision. One common adaptive technique is to provide variable output of inflation gas. For low speed collisions, or when the occupant is out of position (i.e., sitting well forward on the seat, to be quite near the airbag), the inflator produces a small amount of gas to provide "soft" cushioning. For high speed collisions (or for a heavier occupant, etc.), the inflator produces more gas to provide a "firm" cushioning. The present inflator may be formed to provide variable gas output.

Specifically, as is best shown in FIG. 2, the outer wall 46 may include a divider wall 98 extending across the interior chamber 52 to divide the interior chamber 52 into two separate subchambers, each accessible from one of the ends of the outer wall 46. This divider wall 98 may be fixed in place as by welding, but is preferably formed as a monolithic portion of the outer wall 46, such as by a double impact extrusion process. Each of the subchambers will be provided with the pair of end seals 78, filter 64 and capsule 84 (or loose pellets, wafers, etc.), and each of the end caps 48 and 50 will be provided with a squib 56. As may be envisioned, the firing of one squib 56 will cause the generant 54 to combust and the gas to flow from the gas exit ports 62, without causing combustion of the generant 54 in the other subchamber. As such, only one squib 56 may be fired for "soft" cushioning, or both squibs 56 may be fired for "firm" cushioning. Furthermore, in "firm" cushioning, the squibs 56 may be fired at the same time, or with a slight delay, to achieve the desired inflation rate. Even beyond this, the amount of generant 54 (and therefore gas produced) in each subchamber need not be equal, but may be different (as shown) to provide further variation in performance.

The possible modifications to this inflator are not limited to either adaptive or non-adaptive, but extend to the various components of the inflator also.

As a first example, depending upon generant formulation, it may be desired to provide the capsule 84 with a pre-cooling screen 100. The pre-cooling screen 100 may be a tube formed of any of the materials noted above for the filter 64, placed within the capsule 84 between the generant 54 and side wall 86. The pre-cooling screen 100 will serve to cool the gas (and to some extent filter, depending upon porosity and/or pore size) before it reaches the filter 64, to ensure that the gas is at a sufficiently low temperature for safety. The pre-cooling screen 100 will of course reduce the amount of generant 54 which may be held in the capsule 84. However, as with the capsule 84, the thickness of the pre-cooling screen 100 has been exaggerated for clarity, and the reduction in generant volume is acceptable. The pre-cooling screen 100 can also serve to maintain the shape of the capsule 84, before, during and after assembly into the inflator.

Figure 7:
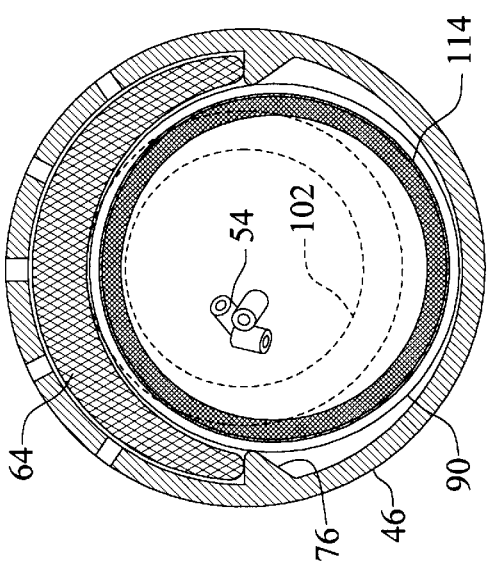
FIG. 7 is a cross-sectional view along line 7—7 of FIG. 6.
Figure 6:
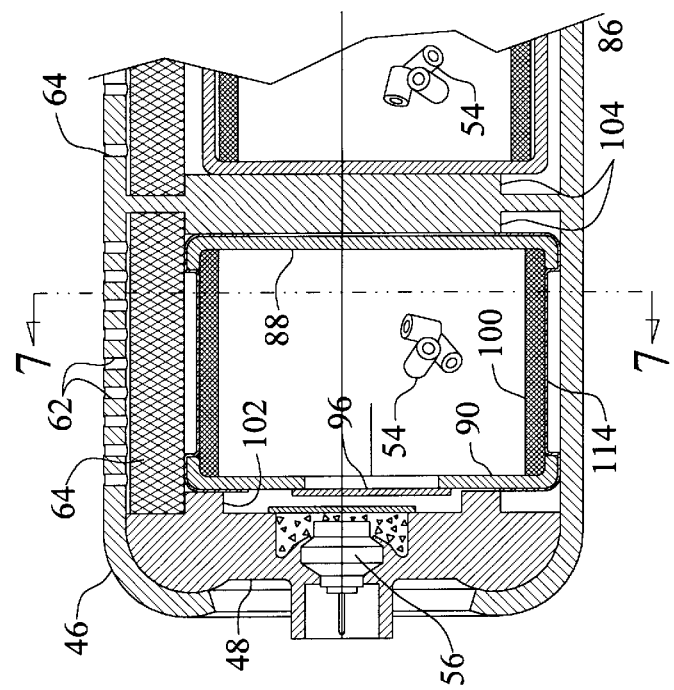
FIG. 6 is a cross-sectional side view of an inflator according to a third embodiment of the present invention.

Additional component variations are shown in a second embodiment of the inflator, shown in FIGS. 6 and 7. Here, the filter 64 is a reduced extent filter as in the previous embodiment, but the arrangement to position and seal the filter is modified. Specifically, the seal 78 is not employed, but the end cap 48 includes a positioning rib 102 extending longitudinally outward from its inner face. While the rib could be contoured to closely surround the reduced extent and taper of the filter, it may alternatively be a constant diameter ring coaxial with the first end cap 48, as best illustrated in FIG. 7. The positioning rib 102 will serve to block flow-by of the generated gas due to the tortuous path the gas would be required to follow to flow around the longitudinal end of the filter 64. Such a ring-shaped positioning rib 102 will be closest to the entrance face of the filter in the central region, corresponding to the main body 66, providing the tortuous path. The ring-shaped rib will be progressively spaced from the filter, however, toward the lateral edges 68 of the filter due to the tapering. Despite this spacing, a filter having the desired reduced porosity toward the lateral edges 68 will still provide sufficient protection against flow-by.

This same arrangement could be provided in the second end cap 50, with the support ledges 76 providing the desired clocking of the filter 64. For an adaptive inflator employing the divider wall 98, the divider wall may be provided with a wall rib 104 similar to the positioning rib 102 described above, and formed during the impact extrusion, or by a separate impacting or milling step. The wall rib 104 may extend fully across the face of the divider wall 98, as shown, to provide more support to the capsule 84, and to reduce free volume within the inflator.

Figure 8:
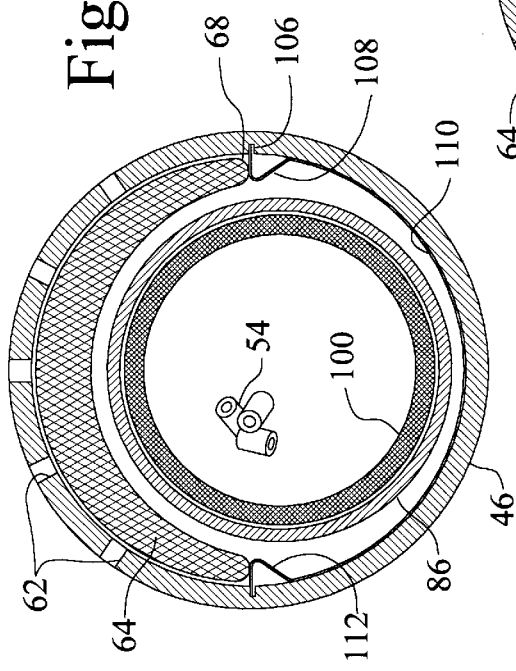
FIG. 8 is a cross-section view similar to FIG. 7 showing a further embodiment of the present invention.

When providing the wall rib 104, it may be difficult to also provide the support ledges 76. To eliminate this problem, a further modification is possible, as shown in FIG. 8. Here, the inner face of the outer wall 46 is provided with a pair of guide slots 106, approximately at the anticipated position of the lateral edges 68. A support insert 108 is then provided to mount within the guide slots 106 an support the lateral edges 68 of the filter 64. The support insert 108 includes a central span 110 which extends along the interior of the outer wall 46 between the guide slots 106, and at each lateral end of the central span 110 the support insert 108 is bent to form a V-shaped insert ledge 112. The free edge of each insert ledge 112 is received in an associated one of the guide slots 106. To ensure that the support insert 108 remains in position, it may be formed of a resilient material such as spring steel, and be elastically deformed during insertion of the free edges of the insert ledges 112 into the guide slots 106. While the support insert 108 could be continuous (i.e., forming a section of a cylinder), various openings (not shown) could be formed therein to reduce the amount of material required for the support insert 108. Additionally, the use of the support insert 108 and guide slots 106 is not limited to the embodiment having the wall rib 104, but could be used with the flat divider wall 98 (and end cap) and end seals 78 shown in the embodiment of FIGS. 2–3.

Modifications to the capsule 84 are possible also. For example, the support provided by the pre-cooling screen 100 may be used to eliminate the side wall 86. As shown in FIG. 6, the end wall 88 and flow cap 90 may be crimped over the ends of the pre-cooling screen 100 directly. Further, to reduce moisture entering the generant 54, and dust from the generant 54 exiting, the capsule 84 may include a rupture sleeve 114 secured thereabout, such as by a shrink fit plastic or other film. While not shown, one or both of the end wall 88 and flow cap 90 could be formed by an appropriate extension of such a plastic sleeve. As may be envisioned, a flow cap 90 formed from a plastic film would of course be readily rupturable without the need for an access port 94 and rupture sheet 96.

It should be apparent that the various modifications described herein are not limited to use with the particular components shown with them. For example, the capsule 84 may be used with filters having a constant thickness, filters having a constant thickness (such as those shown in FIG. 1) could employ the desired porosity variation, capsules having the side wall 86 may be used with capsules having the plastic sleeve 114 in adaptive inflators (as shown in FIG. 6), etc.

From the foregoing it will be seen that this invention is one well adapted to attain all ends and objects hereinabove set forth together with the other advantages which are obvious and which are inherent to the structure.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A filter for an airbag inflation device, comprising:

a mass of material providing filtration and cooling for a high pressure and high velocity gas said mass including;

an entrance face, and an exit face, said exit face being spaced from said entrance face in a direction of gas flow;

a main body extending between said faces, said main body being bounded by longitudinal ends and lateral edges;

said main body having a defined porosity, and said porosity decreasing appreciably toward each of said lateral edges to force flow of said gas through said main body rather than said lateral edges and wherein said mass of material providing filtration includes a plurality of layers of filtration material, an outer mesh covering surrounding said main body and lateral edges, and wherein said lateral edges have been compressed relative to said main body, said compression causing said tapering reduction in thickness toward said lateral edges;

said filter in combination with an airbag inflator, said combination including;

said inflator including an outer wall having longitudinal ends, first and second end caps mounted to said longitudinal ends of said outer wall to define therewith and interior chamber;

a plurality of gas exit ports extending through said outer wall;

a mass of gas generant material mounted within said interior chamber;

said filter being mounted within said interior chamber at a position intermediate said gas generant material and said gas exit ports; and a squib mounted in one of said end caps.

2. A filter as in claim 1, wherein said mass includes a plurality of layers of filtration material and an outer mesh covering surrounding said main body and lateral edges, and wherein said lateral edges have been compressed relative to said main body, said compression causing said tapering reduction in thickness.

3. The combination of claim 1, wherein said outer wall further includes a divider wall extending across said interior chamber, dividing said interior chamber into two subchambers, a portion of said gas exit ports communicating with a first of said subchambers, and the remainder of said gas exit ports communicating with a second of said subchambers, each of said subchambers including said mass of generant and said filter, and a squib mounted in the other of said end caps.

4. The combination of claim 1, further including an end seal mounted intermediate each adjacent pair of said longitudinal ends of said filter and said end caps.

5. The combination of claim 1, wherein at least one of said end caps includes a positioning rib extending therefrom into said interior chamber, said rib positioned to at least partially retain said filter.

6. The combination of claim 1, wherein said outer wall further includes a divider wall extending across said interior chamber, dividing said interior chamber into two subchambers, a portion of said gas exit ports communicating with a first of said subchambers, and the remainder of said gas exit ports communicating with a second of said subchambers, each of said subchambers including said mass of generant and said filter, and a squib mounted in the other of said end caps.

7. The combination of claim 1, further including an end seal mounted intermediate each adjacent pair of said longitudinal ends of said filter and said end caps.

8. The combination of claim 1, wherein at least one of said end caps includes a positioning rib extending therefrom into said interior chamber, said rib positioned to at least partially retain said filter.

9. The combination of claim 1, wherein said outer wall further includes a pair of support ledges extending into said interior chamber, said ledges being positioned to support said lateral edges of said filter.

10. The combination of claim 1, wherein said outer wall further includes a pair of guide slots, and said combination further includes a support insert, said insert having a central span and an insert ledge mounted at each lateral edge of said central span, each insert ledge having an end received in an associated one of said guide slots to secure said support insert in position opposite to said gas exit ports, and each insert ledge supporting an associated one of said lateral edges of said filter.

11. The combination of claim 1, wherein said generant is a cylindrical generant form.

12. The combination of claim 11, wherein said cylindrical generant form is a capsule, said capsule comprising a side wall having longitudinal ends, said side wall sized for insertion into said airbag inflator, an end wall closing a first of said ends, a flow cap closing a second of said ends, and said mass of gas generant material being held within said walls and cap.

13. The combination of claim 12, wherein said outer wall further includes a divider wall extending across said interior chamber, dividing said interior chamber into two subchambers, a portion of said gas exit ports communicating with a first of said subchambers, and the remainder of said gas exit ports communicating with a second of said subchambers, each of said subchambers including said mass of generant and said filter, and a squib mounted in the other of said end caps.

14. The combination of claim 1, wherein said entrance face and said exit face each have a diameter defining a center point, said center point of said entrance face being offset from said center point of said exit face in a direction extending from said exit face toward said entrance face, said offset causing a tapering reduction in thickness between said faces toward each of said lateral edges.

15. The combination of claim 14, wherein said generant is a cylindrical generant form.

16. The combination of claim 15, wherein said cylindrical generant form is a capsule, said capsule comprising a side wall having longitudinal ends, said side wall having a diameter approximately equal to that of said entrance face of said filter, an end wall closing a first of said ends, a flow cap closing a second of said ends, and said mass of gas generant material being held within said walls and cap.

17. The combination of claim 16, wherein said outer wall further includes a divider wall extending across said interior chamber, dividing said interior chamber into two subchambers, a portion of said gas exit ports communicating with a first of said subchambers, and the remainder of said gas exit ports communicating with a second of said subchambers, each of said subchambers including said mass of generant and said filter, and a squib mounted in the other of said end caps.

18. A capsule as in claim 16, wherein at least said side wall is at least partially rupturable to permit gas created by said gas generant material to flow from said capsule.

19. A capsule as in claim 18, wherein said side wall and said end cap are formed as a monolithic unit of drawn aluminum.

20. A capsule as in claim 19, wherein said flow cap includes an access port extending therethrough, and further including a rupture sheet secured over said access port.

21. A capsule as in claim 19, further including ignition material mixed with said gas generant material.

22. A capsule as in claim 19, further including a pre-cooling screen intermediate said gas generating material and said side wall.

23. A capsule as in claim 16, wherein said side wall includes a pre-cooling screen and a rupture sleeve covering an exterior of said pre-cooling screen.

24. A capsule as in claim 23, wherein said flow cap includes an access port extending therethrough, and further including a rupture sheet secured over said access port.

25. A capsule as in claim 23, further including ignition material mixed with said gas generant material.

26. The combination of claim 1, wherein said outer wall further includes a pair of support ledges extending into said interior chamber, said ledges being positioned to support said lateral edges of said filter.

27. The combination of claim 1, wherein said outer wall further includes a pair of guide slots, and said combination further includes a support insert, said insert having a central span and an insert ledge mounted at each lateral edge of said central span, each insert ledge having an end received in an associated one of said guide slots to secure said support insert in position opposite to said gas exit ports, and each insert ledge supporting an associated one of said lateral edges of said filter.

28. The combination of claim 1, wherein said mass of material providing filtration includes a plurality of layers of filtration material, an outer mesh covering surrounding said main body and lateral edges, and wherein said lateral edges have been compressed relative to said main body, said compression causing said tapering reduction in thickness toward said lateral edges.

29. The combination of claim 1, wherein said generant is a cylindrical generant form.

30. The combination of claim 29, wherein said cylindrical generant form is a capsule, said capsule comprising a side wall having longitudinal ends, said side wall having a diameter approximately equal to that of said entrance face of said filter, an end wall closing a first of said ends, a flow cap closing a second of said ends, and said mass of gas generant material being held within said walls and cap.

31. The combination of claim 30, wherein said outer wall further includes a divider wall extending across said interior chamber, dividing said interior chamber into two subchambers, a portion of said gas exit ports communicating with a first of said subchambers, and the remainder of said gas exit ports communicating with a second of said subchambers, each of said subchambers including said mass of generant and said filter, and a squib mounted in the other of said end caps.

32. The combination of claim 30, wherein said mass of material providing filtration includes a plurality of layers of filtration material, an outer mesh covering surrounding said main body and lateral edges, and wherein said lateral edges have been compressed relative to said main body, said compression causing said tapering reduction in thickness toward said lateral edges.

33. The combination of claim 32, wherein said outer wall further includes a divider wall extending across said interior chamber, dividing said interior chamber into two subchambers, a portion of said gas exit ports communicating with a first of said subchambers, and the remainder of said gas exit ports communicating with a second of said subchambers, each of said subchambers including said mass of generant and said filter, and a squib mounted in the other of said end caps.

34. A capsule as in claim 30, wherein at least said side wall is at least partially rupturable to permit gas created by said gas generant material to flow from said capsule.

35. A capsule as in claim 34, wherein said side wall and said end cap are formed as a monolithic unit of drawn aluminum.

36. A capsule as in claim 35, wherein said flow cap includes an access port extending therethrough, and further including a rupture sheet secured over said access port.

37. A capsule as in claim 35, further including ignition material mixed with said gas generant material.

38. A capsule as in claim 35, further including a pre-cooling screen intermediate said gas generating material and said side wall.

39. A capsule as in claim 30, wherein said side wall includes a pre-cooling screen and a rupture sleeve covering an exterior of said pre-cooling screen.

40. A capsule as in claim 39, wherein said flow cap includes an access port extending therethrough, and further including a rupture sheet secured over said access port.

41. A capsule as in claim 39, further including ignition material mixed with said gas generant material.

* * * * *